Dec. 4, 1923.                                              1,476,327
F. S. DUESENBERG
INTERNAL COMBUSTION ENGINE
Filed Nov. 18, 1920          2 Sheets-Sheet 1
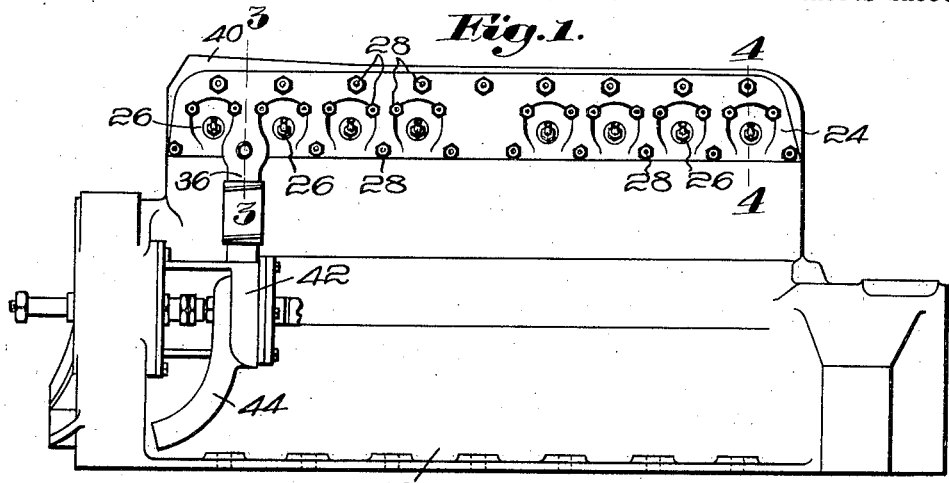
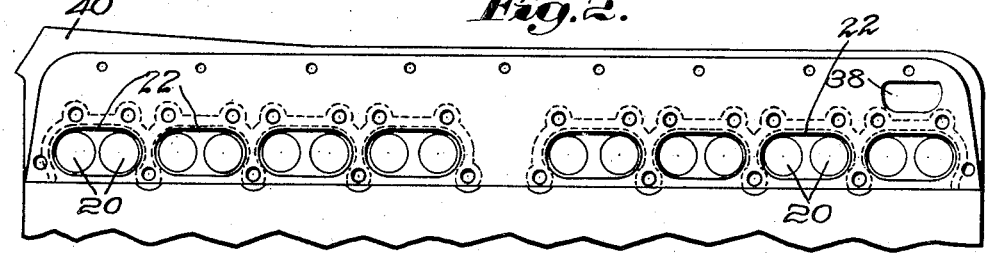
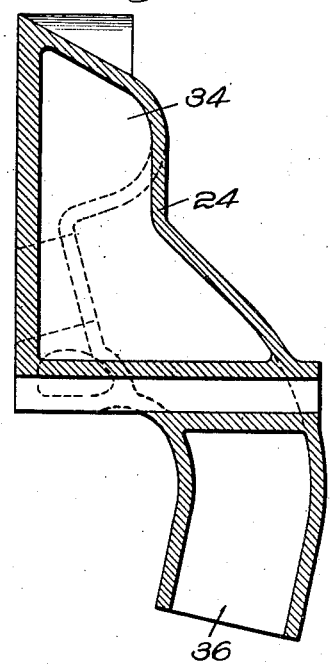
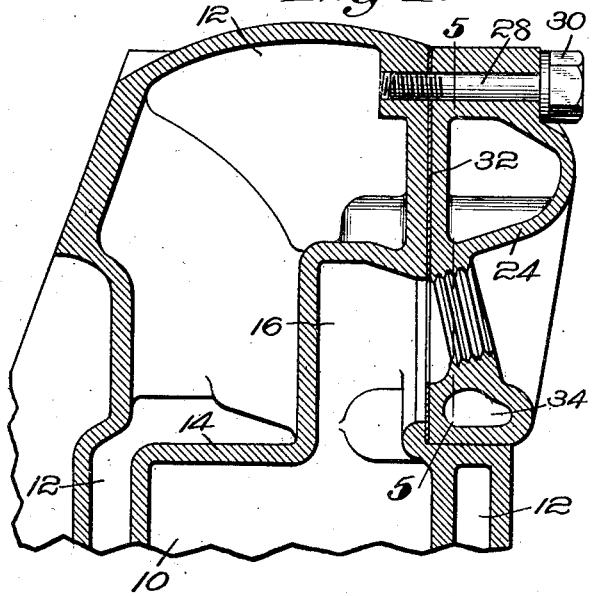
Inventor:
Frederick S. Duesenberg
by Emery, Booth, Janney + Varney
Attys.

Dec. 4, 1923.

F. S. DUESENBERG

INTERNAL COMBUSTION ENGINE

Filed Nov. 18, 1920    2 Sheets-Sheet 2

1,476,327

Inventor:
Frederick S. Duesenberg.

Patented Dec. 4, 1923.

1,476,327

UNITED STATES PATENT OFFICE.

FREDERICK S. DUESENBERG, OF ELIZABETH, NEW JERSEY.

INTERNAL-COMBUSTION ENGINE.

Application filed November 18, 1920. Serial No. 424,998.

*To all whom it may concern:*

Be it known that I, FREDERICK S. DUESENBERG, a citizen of the United States, and a resident of Elizabeth, in the county of Union and State of New Jersey, have invented an Improvement in Internal Combustion Engines, of which the following description, in connection with the accompanying drawings, is a specification, like characters on the drawings representing like parts.

This invention relates to internal combustion engines and is more especially concerned with novel provisions for the cooling of the spark plug or plugs and provisions to facilitate access to the combustion chamber or chambers, the removal of carbon therefrom and the grinding of the valves.

My invention will be best understood by reference to the following description when taken in connection with the accompanying drawings of one illustrative embodiment thereof, while its scope will be more particularly pointed out in the appended claims.

In the drawings:

Fig. 1 is a side elevation of a portion of an internal combustion engine exemplifying my invention;

Fig. 2 is a side elevation on an enlarged scale of the upper portion of the cylinders showing the same as they appear when the water jacketed cover containing the spark plugs is dismounted;

Fig. 3 is a sectional view on a still larger scale on line 3—3 of Fig. 1;

Fig. 4 is a sectional view on the same scale as Fig. 3 on line 4—4 of Fig. 1;

Figure 5:
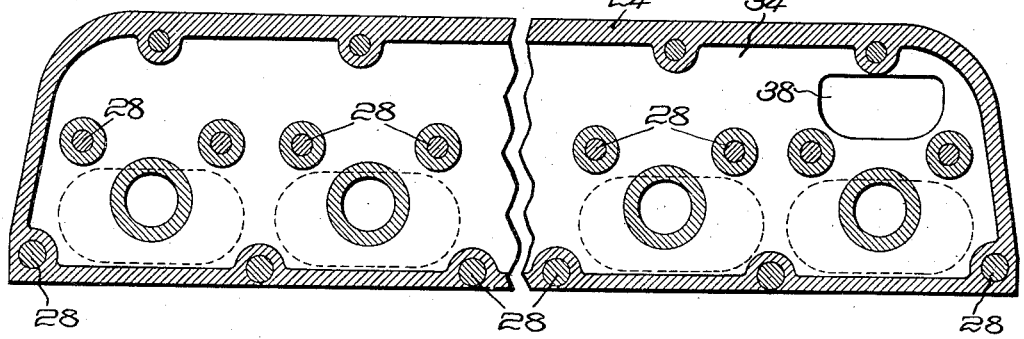
Fig. 5 is a sectional view on a reduced scale on line 5—5 of Fig. 4.
Figure 6:
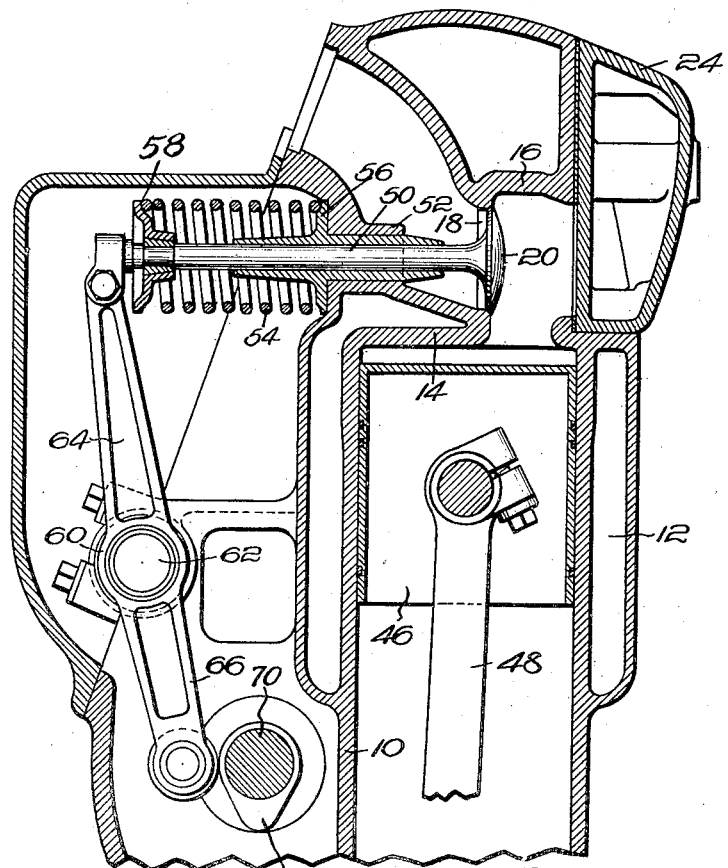
Fig. 6 is a vertical sectional view on an enlarged scale of the upper portion of the engine in a plane containing the axis of one of the valves.

Referring to the drawings and to the embodiment of my invention which I have selected for exemplification, I have shown an internal combustion engine having a crank case 8 surmounted by one or more, herein a plurality of cylinders 10, herein cast en bloc and provided with a water jacket 12 about the cylinder heads and walls. In the present example, each cylinder has a head 14 cast integral therewith and provided with a combustion chamber 16, which is elongated in the direction of the length of the cylinder, and inlet and exhaust ports 18 controlled by inlet and exhaust valves 20, herein of the poppet type. Each combustion chamber is also provided with an opening 22 (see Fig. 2) of such dimensions as to permit the removal of the valves therethrough and to permit the latter to be ground as well as to facilitate the removal of carbon from the combustion chambers. These several openings 22 are closed by a removable cover 24, herein serving also as a mounting for usual spark plugs 26 threaded thereinto, the electrodes of the plugs being presented within the combustion chambers, respectively. The cover is secured to the cylinder casting by a plurality of studs 28 threaded into the cylinder casting, extending through the cover and provided with nuts 30, removal of which permits the cover to be dismounted, thereby to afford access to the combustion chambers and valves. A gasket 32 interposed between the cylinder casting and cover prevents leakage at the joint between them.

An important feature of my invention is the provision of a water jacket space 34 within the cover and surrounding the spark plugs. Water enters this jacket through an inlet 36 and leaves by way of an outlet 38 (see Figs. 2 and 5), the latter discharging into the main water jacket 12 which is about the cylinder heads and sides. Thus the water which is discharged into the main water jacket at one end of the cylinder block passes over all of the cylinders in succession through a single water chamber, and prevents the formation of any steam pockets which are apt to form in other systems where water is taken in at more than one inlet. The advantage is that with the elimination of steam pockets, the cooling effect is substantially uniform. Preferably the inlet 36 is adjacent one end of the cover and the outlet 38 adjacent the other end. The main water jacket 12 discharges through a usual outlet 40 to a customary radiator (not shown herein). Cooling water is supplied to the inlet by suitable means, herein a usual pump 42 having an inlet 44. It should now be evident that the cool water drawn from the bottom of the radiator by the pump is discharged by the latter into the water jacket for the spark plugs, thus cooling the latter thoroughly before passing to the main water jacket. This is important for several reasons, the principal one being that the spark plug porcelains are prevented from becoming red hot and causing pre-ignition. Since the porcelains are well cooled, there is, of course, much less likelihood of their becoming cracked.

Working in each of the cylinders 10 is a usual piston 46 connected by a connecting rod 48 to a usual crank-shaft (not shown). Each valve is provided with a valve stem 50 working in a guide 52, herein transverse to the longitudinal axis of the cylinder. A usual spring 54 encircling the valve stem bears at one end against a fixed abutment 56 and at the other end against an abutment 58 in the form of a collar secured to the valve stem. The valve is opened in opposition to the spring by suitable valve actuating mechanism, herein a lever 60 fulcrumed at 62 and having two arms 64 and 66, one engaging the outer end of the valve stem and the other cooperating with a usual cam 68 on the cam-shaft 70, the turning of which is accompanied by rocking movement of the lever and opening and closing of the valve in a well-known manner.

Having thus described one embodiment of my invention, but without limiting myself thereto, what I claim and desire by Letters Patent to secure is:

1. In an internal combustion engine, the combination of a cylinder and a piston working therein, valve means to control the admission of the fuel charge to and the exhaust of the products of combustion from said cylinder, a spark plug to ignite the fuel charge in the cylinder, and cooling means having provision to direct a cooling medium serially first about the spark plug to the exclusion of said valve means and subsequently about said valve means.

2. In an internal combustion engine, the combination of a cylinder and a piston working therein, valve means to control the admission of the fuel charge to and the exhaust of the products of combustion from said cylinder, a spark plug to ignite the fuel charge in the cylinder, and cooling means including a jacket about said spark plug, a jacket about said valve means, and means to cause a stream of cooling fluid to be directed first through the first-mentioned jacket and subsequently through the second-mentioned jacket.

3. In an internal combustion engine, the combination of a plurality of cylinders and pistons working therein, valve means to control the admission of the fuel charge to and the exhaust of the products of combustion from said cylinder, a plurality of spark plugs to ignite the fuel charges in said cylinders, respectively, and cooling means having provision to direct a cooling medium first about the spark plugs, successively to the exclusion of said valve means and subsequently about said valve means.

4. In an internal combustion engine, the combination of a plurality of cylinders and pistons working therein, valve means to control the admission of the fuel charge to and the exhaust of the products of combustion from said cylinders, a plurality of spark plugs to ignite the fuel charges in said cylinders, respectively, and cooling means including a spark plug jacket having an inlet and an outlet, and a jacket having an inlet communicating with said outlet and leading thence about said valve means.

5. In an internal combustion engine, the combination of a cylinder and a piston working therein, valve means to control the admission of the fuel charge to and the exhaust of the products of combustion from said cylinder, a spark plug to ignite the fuel charge in said cylinder, and a cooling system including a pump whose outlet discharges a cooling medium first about said spark plug to the exclusion of said valve means, and conduit means to conduct the cooling medium thence about said valve means.

6. In an internal combustion engine, the combination of a cylinder and a piston working therein, valve means to control the admission of the fuel charge to and the exhaust of the products of combustion from said cylinder, a spark plug to ignite the fuel charge in said cylinder, and a cooling system including a pump and means to enforce a flow of the cooling medium from said pump first about said spark plug to the exclusion of said valve means, and thence about said valve means.

In testimony whereof I have signed my name to this specification.

FREDERICK S. DUESENBERG.